（12）United States Patent
Huang et al.

(10) Patent No.: US 7,949,194 B2
(45) Date of Patent: May 24, 2011

(54) METHOD AND APPARATUS FOR MOTION ESTIMATION

(75) Inventors: Chao-Tsung Huang, Kaohsiung (TW); Po-Chih Tseng, Taoyuan County (TW)

(73) Assignee: Novatek Microelectronics Corp., Hsinchu (TW)

( * ) Notice: Subject to any disclaimer, the term of this patent is extended or adjusted under 35 U.S.C. 154(b) by 1601 days.

(21) Appl. No.: 11/163,931

(22) Filed: Nov. 4, 2005

(65) Prior Publication Data

US 2007/0019732 A1    Jan. 25, 2007

(30) Foreign Application Priority Data

Jul. 20, 2005   (TW) .............................. 94124457 A

(51) Int. Cl.
 *G06K 9/46* (2006.01)
(52) U.S. Cl. ........................................................ 382/240
(58) Field of Classification Search .................. 382/240, 382/268; 375/240.19, 240.24, 240.11, 240.21, 375/240.16
See application file for complete search history.

(56) References Cited

U.S. PATENT DOCUMENTS

| 6,128,047 | A  | * | 10/2000 | Chang et al. .................. 348/699 |
| 7,308,145 | B2 | * | 12/2007 | Abe et al. ....................... 382/233 |
| 7,471,725 | B2 | * | 12/2008 | Linzer et al. ............. 375/240.16 |
| 2004/0156435 | A1 | * | 8/2004 | Itoh et al. ................. 375/240.16 |
| 2004/0181419 | A1 | * | 9/2004 | Davis et al. ....................... 705/1 |
| 2006/0008008 | A1 | * | 1/2006 | Song ........................ 375/240.16 |

FOREIGN PATENT DOCUMENTS

| JP | 10136375 | 5/1998 |
| JP | 2003284091 | 10/2003 |
| JP | 2004186897 | 7/2004 |

OTHER PUBLICATIONS

Article titled "A Fast Multi-Resolution Block Matching Algorithm and its LSI Architecture for Low Bit-Rate Video Coding" jointly authored by Lee et al., IEEE Transactions on Circuit and Systems for Video Technology, vol. 11, No. 12, pp. 1289-1301, Dec. 2001.
Article titled "Rate-Distortion Optimized Motion Compensation for Video Compression Using Fixed or Variable Size Blocks" jointly authored by Sullivan et al., IEEE Global Telecommunications Conference, pp. 85-90,1991.
Article titled "Adaptive multiple-candidate hierarchical search for block matching algorithm" jointly authored by Chan et al., IEEE Electronics Letters, vol. 31, No. 19, pp. 1637-1639, Sep. 1995.
"2nd Office Action of Japan counterpart application", issued on Aug. 25, 2009, p. 1-p. 2.

* cited by examiner

*Primary Examiner* — Matthew C Bella
*Assistant Examiner* — Dennis Rosario
(74) *Attorney, Agent, or Firm* — Jianq Chyun IP Office

(57) ABSTRACT

A method for motion estimation and the apparatus thereof are provided. The method for motion estimation uses multi-resolution hierarchial search and allows splitting the optimal block mode at the level of the lowest resolution. The method also allows further splitting of blocks during local refinement at levels of higher resolutions.

18 Claims, 3 Drawing Sheets

METHOD AND APPARATUS FOR MOTION ESTIMATION

CROSS-REFERENCE TO RELATED APPLICATION

This application claims the priority benefit of Taiwan application serial no. 94124457, filed on Jul. 20, 2005. All disclosure of the Taiwan application is incorporated herein by reference.

BACKGROUND OF THE INVENTION

1. Field of the Invention

The present invention relates to a method and an apparatus for motion estimation, and more particularly, to a method using hierarchical search to estimate motion vectors and an apparatus thereof.

2. Description of the Related Art

The motion estimation is the most complicated computing area in terms of the computing amount in the video compression encoder, which also affects the compression result the most. Accordingly, there are many fast algorithms that had been proposed to reduce the computing amount and the memory usage, which also sustains sufficient compression quality.

Among various fast algorithms, the hierarchical search is an algorithm that effectively reduces both of the computing amount and the memory usage. A hierarchical search method that can generate variable blocks had been proposed by J. H. Lee [1] as shown in the flow chart of FIG. 1.

Figure 1:
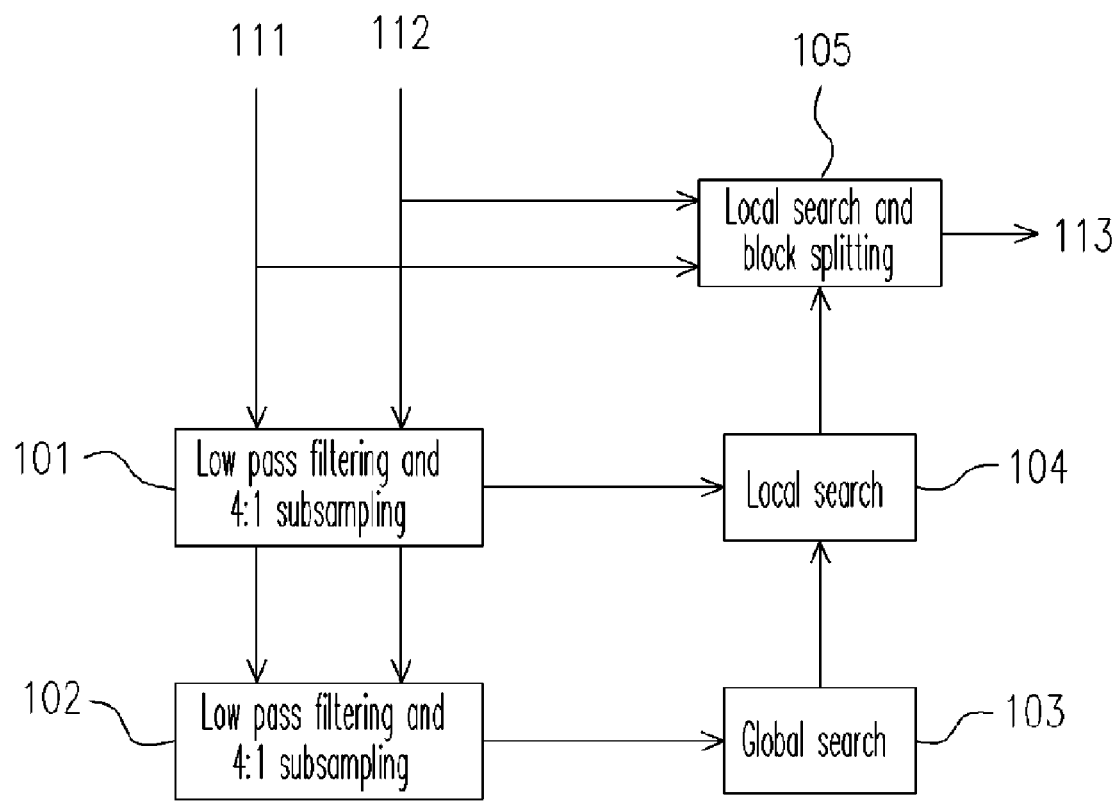

Referring to FIG. 1, first a low pass filtering and a subsampling are performed on the original frame data 111 and the reference frame data 112 in steps 101 and 102, such that three different resolution layers are obtained. They are the original resolution layer, the medium resolution layer, and the lowest resolution layer. Wherein, the original resolution layer contains the original frame data 111 and the reference frame data 112, the medium resolution layer contains the data generated in step 101, and the lowest resolution layer contains the data generated in step 102.

Then, in step 103, a wide range search is performed on the lowest resolution layer, so as to obtain three motion vectors. They are two optimal motion vectors and one predicated motion vector that is obtained from the video standard. Then, in step 104, a local search is performed on the medium resolution layer. Wherein, both of the searches performed in the lowest resolution layer and the medium resolution layer mentioned above use a block size of 16×16. Finally, in step 105, a local search is performed on the original resolution layer on the vicinity of the motion vectors obtained from the medium resolution layer. Meanwhile, the original 16×16 block is split into four 8×8 smaller blocks. And finally the optimal block mode and the motion vector 113 are selected. The drawback of such method is that the motion vectors of small blocks are limited by a very small range. Thus it is not possible to effectively estimate the case where the physical motion vectors between small blocks are far away from each other.

The document referred by the method mentioned above is:
[1] J. H. Lee, et. al., "A fast multi-resolution block matching algorithm and its LSI architecture for low bit-rate video coding," IEEE Trans. Circuits and Systems for Video Technology, vol. 11, no. 12, pp. 1289-1301, December 2001.

SUMMARY OF THE INVENTION

Therefore, it is an object of the present invention to provide a method for motion estimation. With such method, the advantages of low computing amount and low memory usage are sustained, and the optimal variable block mode and the motion vector can be accurately estimated.

It is another object of the present invention to provide an apparatus for motion estimation. The apparatus can provide high efficiency combination of the variable block motion vectors.

In order to achieve the objects mentioned above and others, the present invention provides a method for motion estimation. The method comprises the following steps:

(a) using an original frame data and a reference frame data to form a hierarchical data structure, and the hierarchical data structure comprising N layers, wherein, the $N^{th}$ layer contains the original frame data and the reference frame data, the remaining $i^{th}$ layers contain the data generated based on the original frame data and the reference frame data, and the image resolution of the $i^{th}$ layer is lower than that of the $(i+1)^{th}$ layer, where N is a positive integer greater than or equal to 2, and $1 \leq i < N$;

(b) selecting at least one candidate set from a plurality of candidate sets of a macroblock on the first layer according to costs of the candidate sets mentioned above and providing the selected candidate set(s) to the $2^{nd}$ layer, wherein, each of the candidate sets is a set of a variable block mode of the macroblock and a motion vector of each of the blocks in the variable block mode;

(c) sequentially performing following two substeps on each $i^{th}$ layer in an order of $2 \leq i < N$ starting from the $2^{nd}$ layer if N is greater than 2:

(c1) performing a local search based on the candidate set provided by the $(i-1)^{th}$ layer; and (c2) selecting at least one candidate set from the candidate set(s) obtained from the local search according to cost(s) of the candidate set(s) after the local search and providing the selected candidate set(s) to the $(i+1)^{th}$ layer; and (d) performing the following two substeps on the $N^{th}$ layer:

(d1) performing a local search based on the candidate set(s) provided by the $(N-1)^{th}$ layer; and (d2) selecting one candidate set from the candidate set(s) obtained from the local search according to cost(s) of the candidate set(s) after the local search.

In the method for motion estimation according to an embodiment of the present invention, all of the data for each $i^{th}$ layer are generated from performing the low pass filtering and subsampling on the $(i+1)^{th}$ layer.

In the method for motion estimation according to an embodiment of the present invention, the step (c1) or (d1) further comprises the following substep: deriving a plurality of derived candidate sets from one of the candidate sets and adding the derived candidate sets into the selection of the next step, wherein each of the derived candidate sets and the candidate set mentioned above have the same variable block mode but different motion vectors.

In the method for motion estimation according to an embodiment of the present invention, the step (c1) or (d1) further comprises following substep: deriving a plurality of parallel derived candidate sets from one of the candidate sets and adding the derived candidate sets into the selection of the next step, wherein the variable block modes of each of the derived candidate sets is a result obtained from splitting the variable block mode of the candidate set mentioned above.

According to another aspect of the present invention, the present invention further provides an apparatus for motion estimation, which comprises a layer generator, a global search unit, and a final search unit. Wherein, the layer generator forms a hierarchical data structure with the original frame data and the reference frame data. The hierarchical data structure includes two layers, wherein the second layer contains the original frame data and the reference frame data, the first layer contains the data generated based on the original frame data and the reference frame data, and the image resolution of the first layer is lower than that of the second layer. The global search unit provides at least one candidate set selected from a plurality of candidate sets of a macroblock on the first layer according to costs of the candidate sets mentioned above. The final search unit performs a local search on the second layer based on the candidate set(s) provided by the global search unit, and selects a candidate set from the candidate set(s) obtained form the local search according to costs of the candidate set(s) after the local search.

According to yet another aspect of the present invention, the present invention further provides an apparatus for motion estimation, which comprises a layer generator, a global search unit, a quantity of N−2 local search units, and a final search unit, where N is a positive integer greater than 2. Wherein, the layer generator forms a hierarchical data structure with the original frame data and the reference frame data. The hierarchical data structure includes N layers, wherein the $N^{th}$ layer contains the original frame data and the reference frame data, the remaining $i^{th}$ layers contain the data generated based on the original frame data and the reference frame data, and the image resolution of the $i^{th}$ layer is lower than that of the $(i+1)^{th}$ layer, where i is an integer and $1 \leq i < N$. The global search unit provides at least one candidate set selected from a plurality of the candidate sets of a macroblock on the first layer according to costs of the candidate sets mentioned above. Among the quantity of N−2 local search units, the first local search unit corresponds to the second layer receives the candidate set provided by the global search unit, and the $k^{th}$ local search unit corresponds to the $(k+1)^{th}$ layer receives at least one candidate set provided by the $(k-1)^{th}$ local search unit, where k is an integer and $1 \leq k \leq N-2$. In addition, each of the local search units performs a local search on the corresponding layer based on the received candidate set(s), and provides at least one candidate set selected from the candidate set(s) obtained from the local search according to cost(s) of the candidate set(s) after the local search. The final search unit performs a local search on the $N^{th}$ layer based on the candidate set(s) provided by the $(N-2)^{th}$ local search unit, and selects a candidate set from the candidate set(s) obtained form the local search according to cost(s) of the candidate set(s) after the local search.

In the present invention, the optimal block mode is allowed to split on the first layer with the lowest resolution, and the local search is performed on the layer with higher resolution, such that the block can be further disassembled. Since more flexibility is provided by the present invention, the advantages of low computing amount and low memory usage are sustained, and the optimal variable block mode and the motion vectors are accurately estimated.

BRIEF DESCRIPTION DRAWINGS

The accompanying drawings are included to provide a further understanding of the invention, and are incorporated in and constitute a part of this specification. The drawings illustrate embodiments of the invention, and together with the description, serve to explain the principles of the invention.

FIG. 1 schematically shows a flow chart illustrating a method for motion estimation in the prior art.

Figure 2:
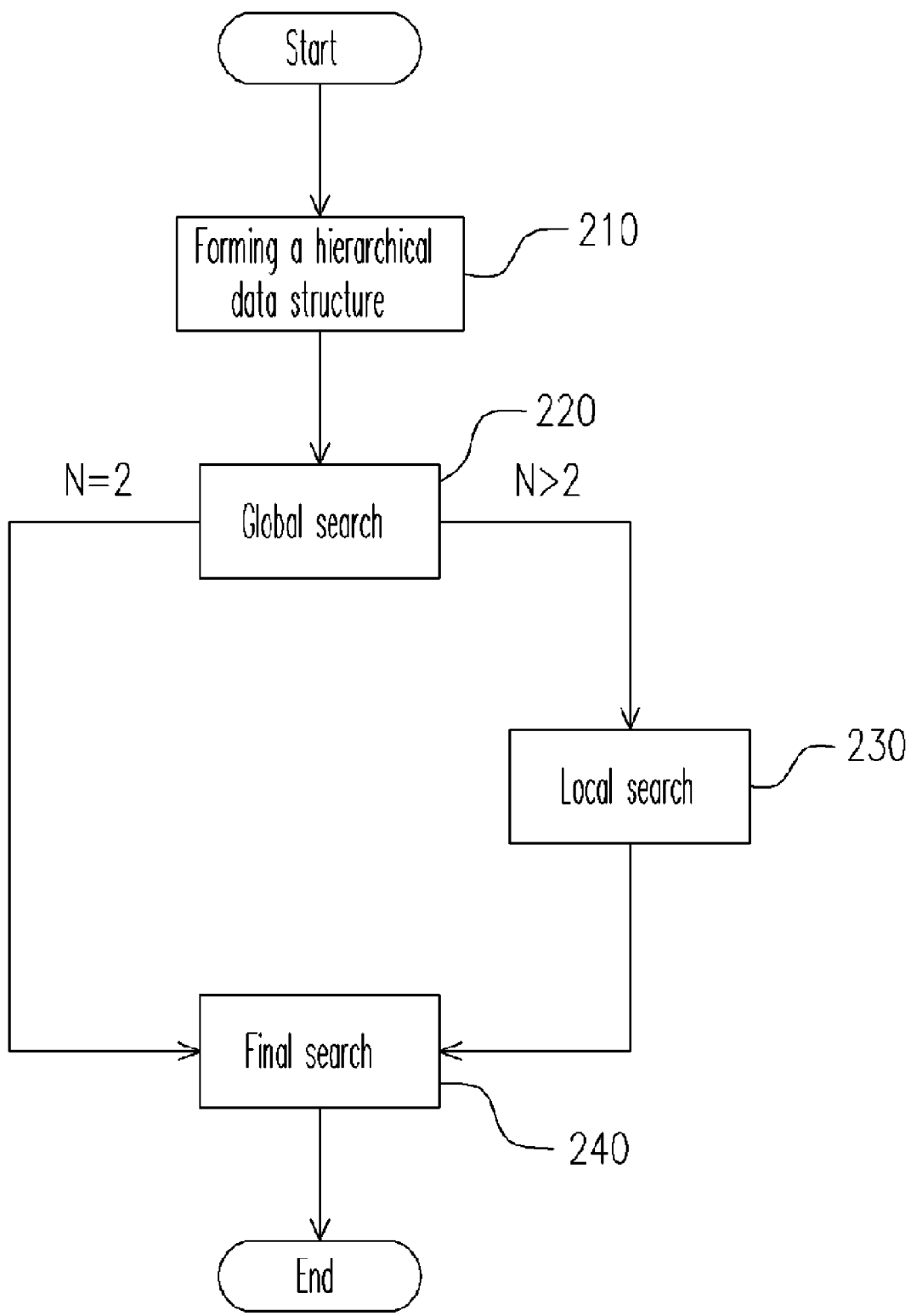

FIG. 2 schematically shows a flow chart illustrating a method for motion estimation according to an embodiment of the present invention.

Figure 3:
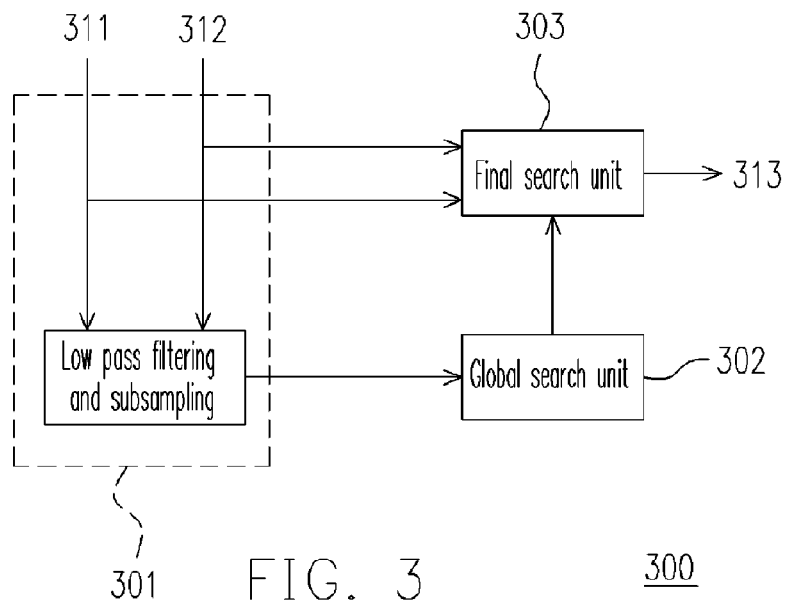
Figure 4:
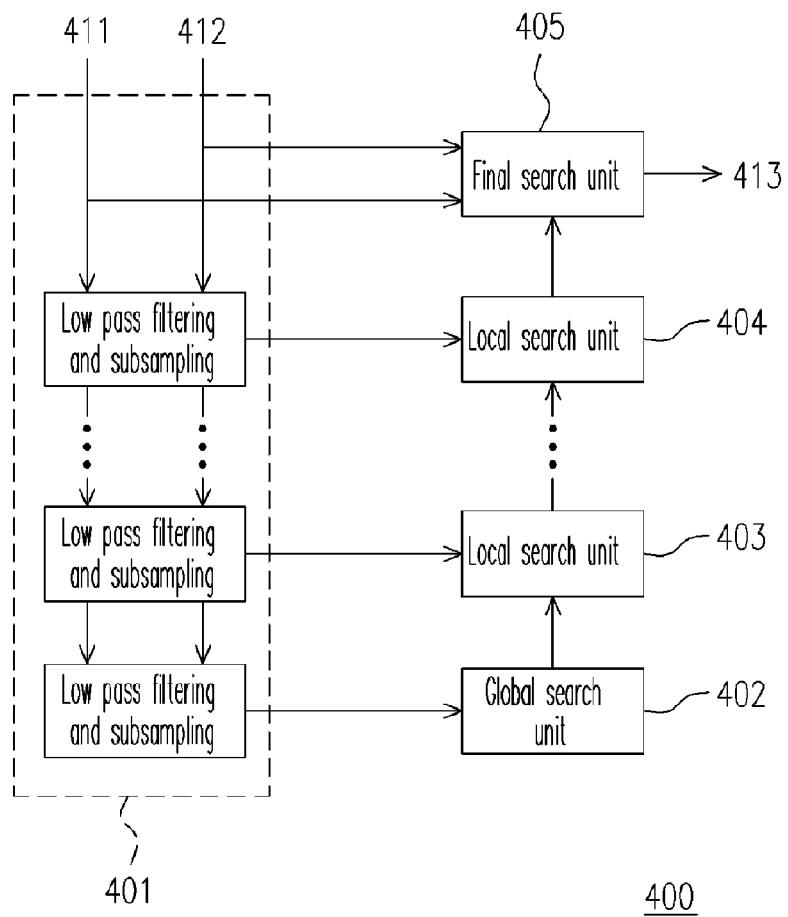

FIG. 3 and FIG. 4 schematically show the diagrams of an apparatus for motion estimation according to an embodiment of the present invention.

DESCRIPTION PREFERRED EMBODIMENTS

The method for motion estimation according to an embodiment of the present invention is described in greater detail with referring to FIG. 2 hereinafter. FIG. 2 is a flow chart of the present embodiment starting from the step 210.

First, in step 210, an N-layer hierarchical data structure is formed by the original frame data and the reference frame data, where N is a positive integer greater than or equal to 2. Wherein, the $N^{th}$ layer is composed of the original frame data and the reference frame data, and the remaining $i^{th}$ layers data are all generated from performing the low pass filtering and subsampling on the $(i+1)^{th}$ layer data, where i is an integer and $1 \leq i < N$. It is known from the description mentioned above that the $N^{th}$ layer is the original resolution layer having the highest image resolution, and the resolution is gradually reduced layer by layer until the first layer, which has the lowest resolution.

Then, in step 220, a global search is performed on the first layer with the lowest resolution, it is also known as the wide-range search, which includes selecting at least one candidate set from a plurality of the candidate sets of a macroblock according to costs of the candidate sets mentioned above and providing the selected candidate set(s) to the second layer. Wherein, each of the candidate sets is a set of a variable block mode of the macroblock mentioned above and a motion vector of each of the blocks in the variable block mode. In addition, candidate set is the data structure finally provided to the video compression encoder.

Regarding to the selecting method mentioned above, in general, the method calculates a cost for every candidate set first, and then compares the costs for further selection, for example, the method selects a certain quantity of the costs having the least amount, or selects a candidate set whose cost is smaller than a specific predetermined value. The cost calculation and the further selecting method are the conventional techniques well known to one of the ordinary skill in the art, thus its detail is omitted herein.

It is differed from the conventional technique in that step 220 does not only select the motion vector of the macroblock, but also selects the variable block mode of the macroblock. In other words, in step 220, a whole macroblock can be reserved or can be disassembled into a plurality of smaller blocks, which are then provided to the second layer. For considering the physical application, if it is not preferred to disassemble the macroblock into smaller blocks in which its size is too small, the costs of the candidate sets of the smaller blocks can be properly tuned for not being selected. Of course, the cost tuning also can be used to avoid the selection of the candidate set of other types.

The subsequent step has two different options, and which option should be selected is based on the hierarchical data structure in step 210. If N is equal to 2, the process goes to step 240, where a final search is performed on the $N^{th}$ layer; and if N is greater than 2, the process goes to step 230 first, where a local search is performed on each layer between the second layer and the $(N-1)^{th}$ layer, and then the process goes to step 240.

As stated above, if N is greater than 2, the process goes to step 230 first, where a local search is sequentially performed on each $i^{th}$ layer starting from the second layer based on the candidate set(s) provided by the $(i-1)^{th}$ layer, where $2 \leq i < N$, and then at least one candidate set is selected from the candidate set(s) obtained from the local search according to costs of the candidate sets after the local search, and the selected candidate set(s) is/are provided to the $(i+1)^{th}$ layer.

In the local search mentioned above, the data with higher resolution on the $i^{th}$ layer is used with the candidate set(s) provided by the $(i-1)^{th}$ layer for re-estimating the motion vectors and re-calculating the costs for further selection. In the local search, a plurality of derived candidate sets may be derived from a candidate set and join the selection. For example, they may have the same variable block mode but different motion vectors. Alternatively, the variable block mode(s) provided by the $(i-1)^{th}$ layer may be further split. For achieving the optimal compression quality, all promising choices can be derived as independent candidate sets and join the selection on the $(i+1)^{th}$ layer. Like in step 220, the cost of a specific candidate set or the candidate sets may be tuned in step 230, such that the filtering result is modified.

The final step 240 is subsequent to the step 220 (where N is equal to 2) or the step 230 (where N is greater than 2). In step 240, first a local search is performed on the $N^{th}$ layer having the original resolution based on the candidate set(s) provided by the $(N-1)^{th}$ layer, and then a candidate set is selected from the candidate set(s) obtained from the local search according to cost(s) of the candidate set(s) after the local search.

In fact, the step 240 is similar to the step 230, the major difference between these two steps is that the layer where the local search is performed on is not the same, and only one candidate set is finally selected as an input of the video compression encoder in step 240. In addition, the local search performed in step 240 also allows the derived candidate sets to be selected, and the costs obtained from the local search are tunable, such that it can prevent a specific candidate set or the candidate sets from being selected.

In addition to the method for motion estimation mentioned above, the present invention further provides an apparatus for motion estimation, which embodies the method for motion estimation. FIG. 3 schematically shows an apparatus for motion estimation 300 according to another embodiment of the present invention. The apparatus for motion estimation 300 embodies the method for motion estimation as shown in FIG. 2, where N is equal to 2.

As shown in FIG. 3, the apparatus for motion estimation 300 comprises a layer generator 301, a global search unit 302, and a final search unit 303. Wherein, the layer generator 301 forms a hierarchical data structure as shown in step 210 with the original frame data 311 and the reference frame data 312. However, the hierarchical data structure of the present embodiment only includes two layers, that is the first layer with the low resolution and the second layer with the original resolution. In addition, the global search unit 302 performs a global search same as the one in step 220 on the first layer to provide at least one candidate set to the final search unit 303. Then, the final search unit 303 performs a final search same as the one in step 240 based on the candidate set mentioned above, so as to select the optimal candidate set 313.

FIG. 4 schematically shows an apparatus for motion estimation 400 according to another embodiment of the present invention. The apparatus for motion estimation 400 embodies the method for motion estimation as shown in FIG. 2, where N is greater than 2.

As shown in FIG. 4, the apparatus for motion estimation 400 comprises a layer generator 401, a global search unit 402, a quantity of N-2 local search units (only two local search units 403 and 404 are shown in FIG. 4), and a final search unit 405. Wherein, the layer generator 401 forms an N-layer hierarchical data structure as shown in step 210 with the original frame data 411 and the reference frame data 412, where N is greater than 2. In addition, the global search unit 402 performs a global search same as the one in step 220 on the first layer of the hierarchical data structure to provide at least one candidate set to the first one of the quantity of N-2 local search units.

Regarding to the quantity of N-2 local search units of the apparatus for motion estimation 400, wherein the first local search unit 403 corresponds to the second layer of the hierarchical data structure receives the candidate set provided by the global search unit 402. The subsequent $k^{th}$ local search unit corresponds to the $(k+1)^{th}$ layer receives the candidate set provided by the $(k-1)^{th}$ local search unit, where k is an integer and $1 \leq k \leq N-2$. In addition, each of the local search units performs a local search in the same way as the one in step 230 on the corresponding layer based on the received candidate set(s), so as to select at least one candidate set.

After the search and selection mentioned above, the final search unit 405 performs a local search in the same way as the one in step 240 on the $N^{th}$ layer having the original resolution based on the candidate set(s) provided by the last local search unit 404, so as to select the optimal candidate set 413.

It is known from the embodiments mentioned above that in the present invention, the optimal block mode is allowed to split on the first layer with the lowest resolution, and the local search is performed on the layer with higher resolution, such that the block can be further disassembled. Since more flexibility is provided by the present invention, the advantages of low computing amount and low memory usage are sustained, and the optimal variable block mode and motion vectors are accurately estimated.

Although the invention has been described with reference to a particular embodiment thereof, it will be apparent to one of the ordinary skill in the art that modifications to the described embodiment may be made without departing from the spirit of the invention. Accordingly, the scope of the invention will be defined by the attached claims not by the above detailed description.

What is claimed is:

1. A method for motion estimation, executed by an apparatus for motion estimation, comprising:
   (a) a layer generator of the apparatus for motion estimation using an original frame data and a reference frame data to form a hierarchical data structure, and the hierarchical data structure comprising N layers, wherein the $N^{th}$ layer contains the original frame data and the reference frame data, the remaining $i^{th}$ layers contain the data generated based on the original frame data and the reference frame data, and an image resolution of the $i^{th}$ layer is lower than an image resolution of the $(i+1)^{th}$ layer, where N is a positive integer greater than or equal to 2, and $1 \leq i < N$;
   (b) a global search unit of the apparatus for motion estimation selecting at least one candidate set from a plurality of candidate sets of a macroblock on the first layer according to costs of the candidate sets mentioned above and providing the selected candidate set(s) to the $2^{nd}$ layer, wherein each of the candidate sets is a set of a variable block mode of the macroblock and a motion vector of each of the blocks in the variable block mode;
   (c) at least one local search unit of the apparatus for motion estimation sequentially performing the following two substeps on each $i^{th}$ layer in an order of $2 \leq i < N$ starting from the $2^{nd}$ layer if N is greater than 2:
   (c1) performing a local search based on the candidate set(s) provided by the $(i-1)^{th}$ layer; and
   (c2) selecting at least one candidate set from the candidate set(s) obtained from the local search according to cost(s) of the candidate set(s) after the local search, and providing the selected candidate set(s) to the $(i+1)^{th}$ layer; and (d) a final search unit of the apparatus for motion estimation performing the following two substeps on the $N^{th}$ layer:

(d1) performing a local search based on the candidate set(s) provided by the $(N-1)^{th}$ layer; and (d2) selecting one candidate set from the candidate set(s) obtained from the local search according to cost(s) of the candidate set(s) after the local search, wherein the apparatus for motion estimation, the layer generator, the global search unit, the local search unit, and the final search unit are hardware.

2. The method for motion estimation of claim 1, wherein the data of each $i^{th}$ layer is generated from performing a low pass filtering and a subsampling on the data of the $(i+1)^{th}$ layer.

3. The method for motion estimation of claim 1, wherein the step (b) further comprises:

tuning one of the costs for preventing the candidate set corresponded to the cost from being selected.

4. The method for motion estimation of claim 1, wherein the step (c2) or (d2) further comprises:

tuning the cost or one of the costs for preventing the candidate set corresponded to the cost from being selected.

5. The method for motion estimation of claim 1, wherein the step (c1) or (d1) further comprises:

deriving a plurality of derived candidate sets from the candidate set or one of the candidate sets and adding the derived candidate sets into the selection of the next step, wherein each of the derived candidate sets and the candidate set mentioned above have the same variable block mode but different motion vectors.

6. The method for motion estimation of claim 1, wherein the step (c1) or (d1) further comprises:

deriving a plurality of derived candidate sets from the candidate set or one of the candidate sets and adding the derived candidate sets into the selection of the next step, wherein the variable block mode for each of the derived candidate sets is a result obtained from splitting the variable block mode of the candidate set mentioned above.

7. An apparatus for motion estimation, comprising:

a layer generator for forming a hierarchical data structure with an original frame data and a reference frame data, and the hierarchical data structure including two layers, wherein the second layer contains the original frame data and the reference frame data, the first layer contains the data generated based on the original frame data and the reference frame data, and an image resolution of the first layer is lower than an image resolution of the second layer;

a global search unit for providing at least one candidate set selected from a plurality of candidate sets of a macroblock on the first layer according to costs of the candidate sets mentioned above, wherein each of the candidate sets is a set of a variable block mode of the macroblock and a motion vector of each of the blocks in the variable block mode; and a final search unit for performing a local search on the second layer based on the candidate set(s) provided by the global search unit, and for selecting a candidate set from the candidate set(s) obtained from the local search according to cost(s) of the candidate set(s) after the local search, wherein the apparatus for motion estimation, the layer generator, the global search unit, and the final search unit are hardware.

8. The apparatus for motion estimation of claim 7, wherein the data of the first layer is generated from performing a low pass filtering and a subsampling on the data of the second layer.

9. The apparatus for motion estimation of claim 7, wherein the global search unit further comprises tuning one of the costs for preventing the candidate set corresponded to the cost from being selected.

10. The apparatus for motion estimation of claim 7, wherein the final search unit further comprises tuning the cost or one of the costs for preventing the candidate set corresponded to the cost from being selected.

11. The apparatus for motion estimation of claim 7, wherein the final search unit further comprises deriving a plurality of derived candidate sets from the candidate set or one of the candidate sets and adding the derived candidate sets into the selection after the local search, wherein each of the derived candidate sets and the candidate set mentioned above have the same variable block mode but different motion vectors.

12. The apparatus for motion estimation of claim 7, wherein the final search unit further comprises deriving a plurality of derived candidate sets from the candidate set or one of the candidate sets and adding the derived candidate sets into the selection after the local search, wherein the variable block mode of each of the derived candidate sets is a result obtained from splitting the variable block mode of the candidate set mentioned above.

13. An apparatus for motion estimation, comprising:

a layer generator for forming a hierarchical data structure with an original frame data and a reference frame data, and the hierarchical data structure including N layers, wherein the $N^{th}$ layer contains the original frame data and the reference frame data, the remaining $i^{th}$ layers contain the data generated based on the original frame data and the reference frame data, and an image resolution of the $i^{th}$ layer is lower than an image resolution of the $(i+1)^{th}$ layer, where N is a positive integer greater than 2 and $1 \leq i < N$;

a global search unit for providing at least one candidate set selected from a plurality of candidate sets of a macroblock on the first layer according to costs of the candidate sets mentioned above, wherein each of the candidate sets is a set of a variable block mode of the macroblock and a motion vector of each of the blocks in the variable block mode;

a quantity of $N-2$ local search units, wherein the first local search unit corresponds to the second layer and receives the candidate set(s) provided by the global search unit, and the $k^{th}$ local search unit corresponds to the $(k+1)^{th}$ layer and receives at least one candidate set provided by the $(k-1)^{th}$ local search unit, k is an integer and $1 \leq k \leq N-2$, each of the local search unit(s) performs a local search on the corresponding layer based on the received candidate set(s), and provides at least one candidate set selected from the candidate set(s) obtained from the local search according to cost(s) of the candidate set(s) after the local search; and a final search unit for performing a local search on the $N^{th}$ layer based on the candidate set(s) provided by the $(N-2)^{th}$ local search unit, and for selecting a candidate set from the candidate set(s) obtained from the local search according to cost(s) of the candidate set(s) after the local search, wherein the apparatus for motion estimation, the layer generator, the global search unit, the local search units, and the final search unit are hardware.

14. The method for motion estimation of claim 13, wherein the data of each $i^{th}$ layer is generated from performing a low pass filtering and a subsampling on the data of the $(i+1)^{th}$ layer.

15. The apparatus for motion estimation of claim 13, wherein the global search unit further comprises tuning one of the costs for preventing the candidate set corresponded to the cost from being selected.

16. The apparatus for motion estimation of claim 13, wherein one of the local search unit(s) and the final search unit further comprises tuning the cost or one of the costs for preventing the candidate set corresponded to the cost from being selected.

17. The apparatus for motion estimation of claim 13, wherein one of the local search unit(s) and the final search unit further comprises deriving a plurality of derived candidate sets from the candidate set or one of the candidate sets and adding the derived candidate sets into the selection after the local search, wherein each of the derived candidate sets and the candidate set mentioned above have the same variable block mode but different motion vectors.

18. The apparatus for motion estimation of claim 13, wherein one of the local search unit(s) and the final search unit further comprises deriving a plurality of derived candidate sets from the candidate set or one of the candidate sets and adding the derived candidate sets into the selection after the local search, wherein the variable block mode of each of the derived candidate sets is a result obtained from splitting the variable block mode of the candidate set mentioned above.

* * * * *